United States Patent [19]

Kiernan et al.

[11] Patent Number: 4,531,535
[45] Date of Patent: Jul. 30, 1985

[54] FLOW DIVIDER

[75] Inventors: James G. Kiernan, Albany; Robert J. Liddell, Ballston Spa; Ronald T. Henke, Schenectady, all of N.Y.

[73] Assignee: General Electric Co., Schenectady, N.Y.

[21] Appl. No.: 444,665

[22] Filed: Nov. 26, 1982

[51] Int. Cl.³ ............................................. G05D 11/03
[52] U.S. Cl. .................................................. 137/99
[58] Field of Search ............... 137/99, 15; 418/212, 418/213, 200; 239/553, 562

[56] References Cited

U.S. PATENT DOCUMENTS

| 796,724 | 8/1905 | Hewitt | 418/200 |
|---|---|---|---|
| 2,291,578 | 7/1942 | Johnson | 91/532 |
| 2,343,912 | 1/1940 | Lauck | 91/532 |
| 2,949,924 | 8/1960 | Cochran | 137/99 |
| 3,495,610 | 2/1970 | Van Aken | 137/99 |
| 3,601,139 | 8/1971 | Kontranowski | 137/99 |
| 4,328,824 | 5/1982 | Kiernan et al. | 137/99 |

Primary Examiner—Martin P. Schwadron
Assistant Examiner—Stephen M. Hepperle
Attorney, Agent, or Firm—J. C. Squillaro

[57] ABSTRACT

A flow divider is described for distributing a fluid, such as fluid oil, in equal volumes from a source to each of a plurality of fuel nozzles of a gas turbine machine. The flow divider includes a plurality of intermeshing gear sets, two rotatable shafts for connecting the gear sets together for operating in unison, a plurality of particulars axially positioned between adjacent gear sets, first and second partition retainers for immmovably positioning the partitions in the axial direction on the rotatable shafts and a split housing for enclosing the gear sets and shafts. Each of the rotatable shafts is mounted on bearings at each end of the housing with one end of each shaft being fixed and the other end being permitted to slide axially.

11 Claims, 8 Drawing Figures

FLOW DIVIDER

BACKGROUND OF THE INVENTION

This invention relates to a flow divider, and more particularly relates to a novel flow divider for equalizing the distribution of fluid fuel to the nozzles of a plurality of combustion cans of a gas turbine arrangement.

Flow dividers or flow distributors for ensuring a continuous equal distribution of a fluid to several different outlets are well known. Conventionally, a plurality of spaced sets of metering spur gears is provided and a common inlet conduit is connected to each of the gear sets. The output fluid from each of the gear sets should then always be balanced regardless of the hydraulic impedance in any of the outlet channels. Configurations of this general type are described, for example, in U.S. Pat. Nos. 2,291,578 to Johnson, 3,601,139 to Kontranowski, 3,495,610 to Van Aken, Jr., 2,343,912 to Lauck and 796,724 to Hewitt. Flow dividers of this general type, consisting of a series of small positive displacement gear pumps all driven in tandem by the pressure of fuel against the inlet side of the gears in each pump in the series, are presently employed in gas turbines for distributing liquid fuel between different combustion can fuel nozzles of the gas turbine.

The distribution of equal quantities of fuel to the different gas turbine fuel nozzles is particularly important under at least two operating conditions. The first is during turbine start-up when the flow divider must compensate for the differences in elevation between the various fuel nozzles. The second condition is during normal operation when, after hundreds of hours of operation, each of the fuel nozzles may accumulate different thicknesses of coke deposits. Nevertheless, the flow dividers are required to supply equal quantities of fuel to the various fuel nozzles, even though the back-pressures in the fuel lines to the individual fuel nozzles may vary from each other due to unequal coking of the various fuel nozzles.

Flow divider designs, which are now in use in gas turbines, generally use the liquid fuel oil being divided as the lubricating fluid for the bearings of the metering gear shafts. This lubrication is satisfactory when using clean fuels; however, when running with certain crude or residual fuels, which contain corrosion causing constituents, the metering shaft lubrication has been unsatisfactory, in that, excessive wear and failure of the bearings has occurred. The gas turbine flow dividers which are presently in use also require relatively complex assembly and disassembly when the device is to be inspected or maintained. Moreover, the designs which are presently used must be tailor-made for different shaft rotation speeds and do not lend themselves to manufacturing standardization.

Finally, the designs presently in use are not tolerant of thermal excursions in the fluid being metered. When such excursions occur, the various components of the flow divider undergo thermal expansion or contraction to a degree that is proportional to the temperature rise of the individual part and its coefficient of thermal expansion. Frequently when such expansion or contraction occurs, operating clearances are reduced, and binding or seizing of the flow divider parts may occur. In gas turbine operation, such binding or seizing of the flow divider can cause a loss of fuel to the combustion system, and the consequent shut down of the gas turbine. It should be noted that thermal transients are common in gas turbines which operate on crude or residual fuels, as usually these fuels have to be heated to temperatures as high as 250° F. in order to achieve proper viscosity for combustion, and in order to ensure that all the wax particles in the fuel have been dissolved. However, the gas turbines start up and shut down on distillate fuel, which is usually at ambient temperature. It is during the changeover, from the distillate fuel to the crude or residual fuel, that a temperature transient up to about 200° F. is experienced. This thermal transient takes place in a matter of a few seconds.

In order to overcome some of these deficiencies in the use of a flow divider for apportioning fuel to the turbine fuel nozzles, U.S. Pat. No. 4,328,824 issued to Kiernan, et al., describes a flow divider with metering gears, unrestrained spacers therebetween and lubricated end roller bearings. The patent describes a flow divider including a plurality of metering gear sets rigidly fixed on two parallel common continuous shafts. Each of the gear sets is separated from adjacent gear sets by separator spacers which are also fixed on the shafts, but free to move in a common radial cavity formed by a split housing enclosing the shafts and gears. Accordingly, the gears are "fixed" in position, which the separator spacers are free to slide in an axial direction. The two parallel common continuous shafts are supported at each end by roller bearings, which are separated from the gear sets by means of seals and which are lubricated by a separate source of lubricant. The roller bearings on one end of the parallel shafts are fixed in an axial location relative to the shafts and the roller bearings on the other end are free to move axially without experiencing binding or seizing of the shafts or roller bearings.

Under ideal conditions, with equal line impedances downstream of the flow divider, the Kiernan, et al. flow divider can provide equal distribution of flow to all nozzles. However, once an impedance develops in any one line the higher resulting back pressure creates an imbalanced axial force on the separator spacers associated with that line's respective gear sets. This axial force displaces the separator spacers further away from the gear sets, increasing the side clearances and, thus, decreasing the gear set efficiency. This results in an unsatisfactory condition.

In addition, experience has shown that although the split housing design of the Kiernan, et al. flow divider facilitates inspection of the device's internals, this feature alone does not aid a mechanic in establishing proper gear-tip to housing clearances. Quite obviously, once the top housing has been removed, there is no way of directly measuring these clearances. This would present a major problem for field repairs where sophisticated techniques for indirect measurement are limited or nonexistent.

It is therefore an object of the present invention to provide an improved flow divider such that metering efficiency is improved by rigidly fixing the separator spacers while allowing the gear sets to be free to slide.

It is another object of the present invention to provide an improved flow divider which includes a means for directly measuring critical gear set clearances while still retaining the split housing concept.

SUMMARY OF THE INVENTION

In accordance with the present invention, we have discovered an improved flow divider for distributing fuel oil in equal volumes from a source to each of a plurality of fuel nozzles of a gas turbine machine. The device includes a plurality of intermeshing gear sets, a first and second rotatable shaft for connecting the gear sets together for operating in unison, a plurality of partitions axially positioned between adjacent gear sets, and a fluid sealing arrangement with the rotatable shafts, first and second partition retainers for immovably positioning the partitions in an axial direction on said rotatable shafts, a housing means including an upper section and a lower section, which encloses said metering gears, the housing having a fluid inlet adapted to supply the fluid to the metering gears, and a plurality of fluid outlets adapted to receive a metered amount of fluid from each of the metering gears.

The partition retainers, in addition to establishing the gear set side clearances by locating the partitions, also form the outer wall confining the gear sets in the radial direction. Thus, the retainers define the gear set tip clearances. This provides the means for directly measuring critical gear clearances with the bottom housing removed. Installation of the bottom housing to the upper housing has no effect on the final clearances.

Gear tip clearances can be adjusted or re-established following maintenance or repairs by placing appropriate shims between the bearing blocks and the upper housing. By inserting or removing these shims the shafts can be raised and lowered as required. Use of feeler stock or other measurement devices allows the mechanic to attain the clearances between gear tip and partition retainer cavity. Each of the rotatable shafts is mounted on bearings at each end of the housing in a bearing cavity with one end of the rotatable shaft being fixed, and the other end permitted to slide axially and thereby accommodate thermal expansions resulting from changes in temperature of the liquid being metered. The bearing cavity is separated from the main body by mechanical face seals.

A timing gear is located at each end of the assembly and is connected to one of the rotatable shafts. A magnetic pickup is used to detect the speed of the flow divider.

BRIEF DESCRIPTION OF THE DRAWING

The invention is more clearly understood from the following description taken in conjunction with the accompanying drawing in which.

DETAILED DESCRIPTION OF THE DRAWING

Our invention is best illustrated by FIGS. 1-4, which consists of several subassemblies or subunits which are designated as follows: case or housing; gears and shafts; partitions and partition retainers; bearings and lubrication; and speed sensor. Construction and the interrelationship of the individual components will be apparent from the remaining figures.

Figure 1:
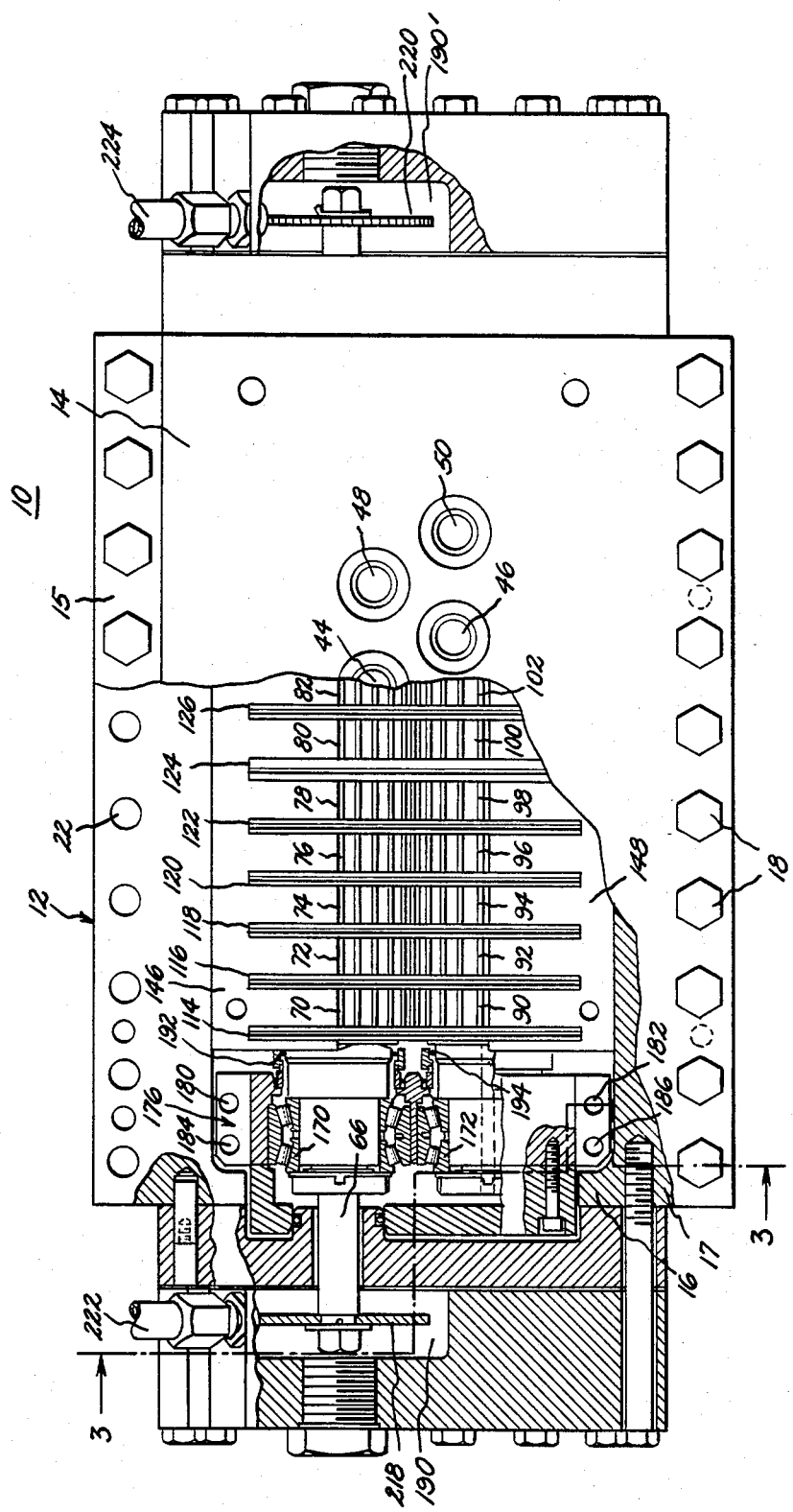
FIG. 1 is a plan view partly in section of the novel flow divider of the present invention.
Figure 2:
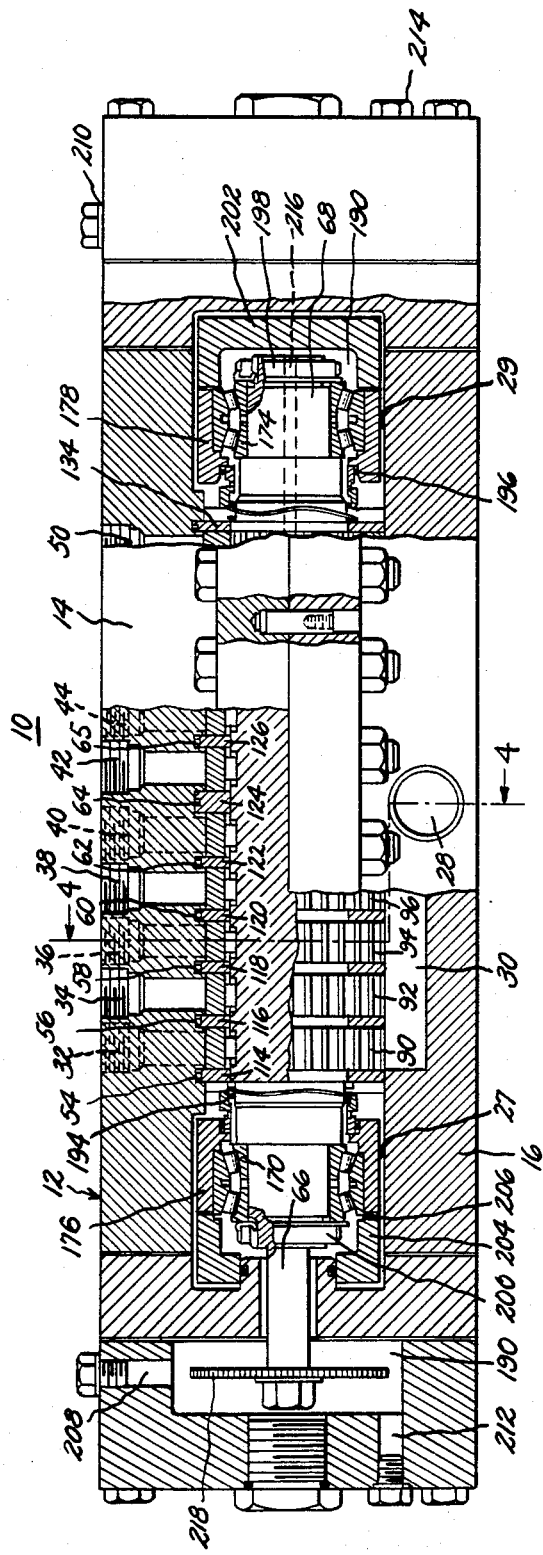
FIG. 2 is a cross-sectional view partly in section of the device shown in FIG. 1.

Referring now to FIG. 1 and FIG. 2 for a general understanding of our invention, we have illustrated a flow divider 10 for ensuring continuous equal distribution of fuel oil from a source thereof under pressure to each of a plurality of nozzles of combustion cans of a gas turbine machine. It will be readily apparent that the supply of fuel to each of the combustors must be substantially identical, since otherwise an imbalance may occur and the operation of the gas turbine machine would be seriously impaired. Flow divider 10 is of the general type that includes a series of small positive displacement gear pumps all driven in tandem by the pressure of fuel against the inlet side of the gear sets in each of the series of gear pumps.

Housing

Figure 4:
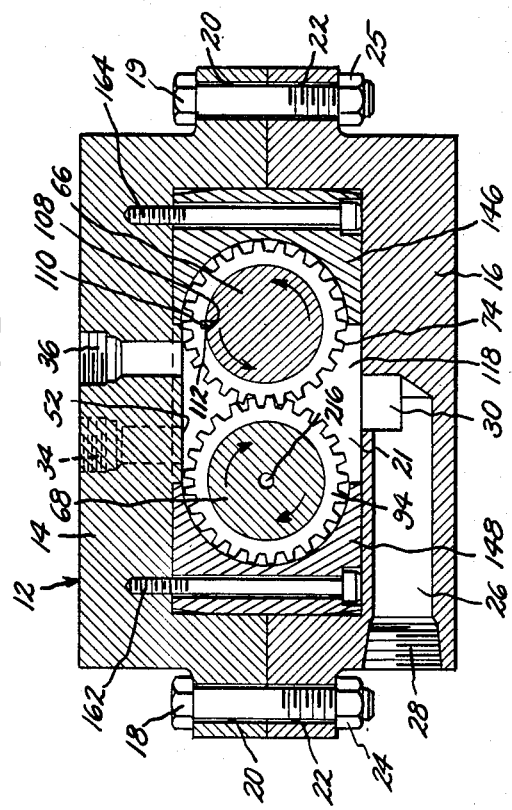
FIG. 4 is a cross-sectional view taken across the section line 4—4 of FIG. 2.
Figure 3:
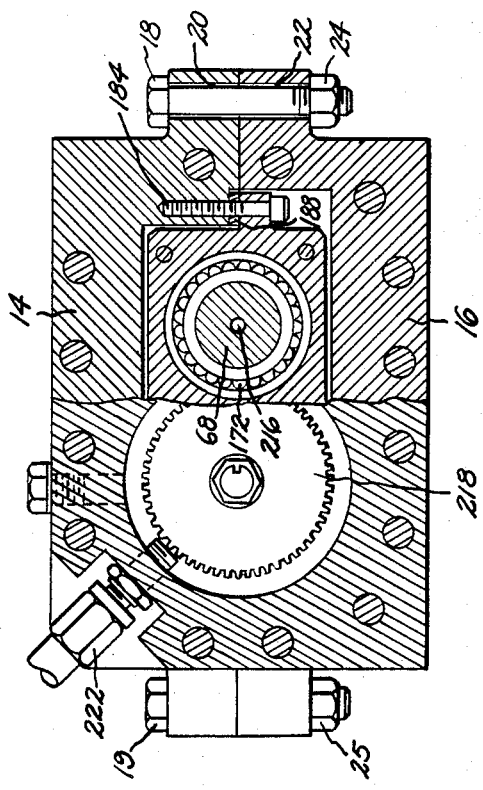
FIG. 3 is a cross-sectional view taken across the section line 3—3 in FIG. 1.

The outer portion of the flow divider 10 is a split housing or case 12, which appears substantially rectangular in shape, having mating housing upper half 14 and housing lower half 16, each of which has opposing front and back sides and opposing left and right ends. The two halves 14 and 16 are each provided with flanges 15 and 17 on the opposing front and back sides respectively, which can be bolted together after assembly of the entire device. For example, bolts 18 and 19 pass through openings 20 in housing upper half 14 and openings 22 in housing lower half 16, and are threaded into nuts 24 and 25 respectively, as shown in FIG. 4. A plurality of similar connecting nuts and bolts are used as best shown in FIG. 1. It will be understood that this half-shell type arrangement will permit simplified assembly of the metering gears.

The interior of the housing 12 defines an elongated cavity 21 having a middle portion for receiving the gear sets (as hereinafter described) and opposed end portions 27 and 29 which permits the suspension of shafts 66 and 68 in bearings 170, 172, 174 and a fourth bearing, not shown. Main flow inlet passage 26 is located in housing lower half 16 and is connected at one end to the source of fuel (not shown) through inlet opening 28 and at the other end is connected to a common inlet feed channel or reservoir 30. For each of the series of gear pumps, the housing upper half 14 contains a plurality of outlet passages 32, 34, 36, 38, 40, 42, 44, 46, 48 and 50, which for example, are alternately staggered to provide room for suitable connecting means. Further, in the interior of the housing upper half 14 and extending over a substantial portion between the opposing ends of the housing there is a ridged section 52 having a plurality of slots 54, 56, 58, 60, 62, 64 and 65 therein, the significance of which will be discussed later.

Gears and Shafts

Figure 5:
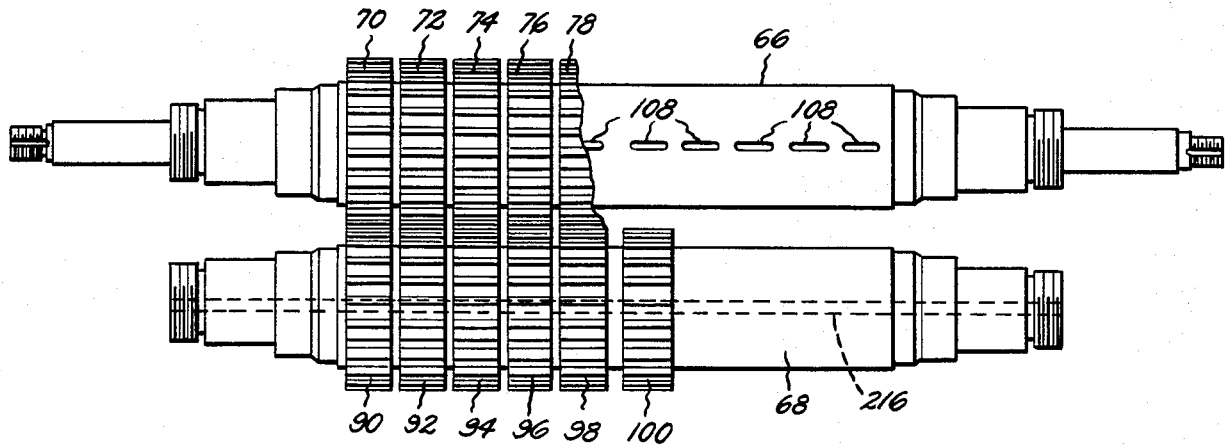
FIG. 5 is a plan view partly broken away of the meshing gears on their respective shafts.

The intermeshing spur gears and their respective shafts are shown in FIG. 5 and a cross-sectional view of a single gear set is shown in FIG. 4. FIGS. 1 and 2 show the gears and shafts in flow divider 10 with portions broken away. First continuous gear shaft 66 and second continuous gear shaft 68 are rotatably mounted within housing 12 and carry cooperating or mating sets of metering gears 70 through 82 on shaft 66 and metering gears 90 through 102 on shaft 68. The remaining gear sets, not shown, are connected to outlets 46, 48 and 50.

The metering gears on each shaft mate with corresponding gears on the other shaft and form mating gear sets. Any desired number, but preferably an even number, of mating gear sets can be used depending upon the number of flow channels which are to receive a divided flow from a common input source. In the embodiment shown herein, ten sets of metering gears are provided.

Referring to FIGS. 4 and 5, first shaft 66 has a center portion having a rounded cross section and two opposed ends. The center portion has a plurality of keyways 108, one for each gear, cut along a straight line into the outer surface, each of which have a matching keyway 110 on its inner circumference. Matching gears 70, 72, 74, 76, 78, etc., are slidably mounted on shaft 66. Key 112 is placed in keyway 108 of shaft 66 and the gears thereon, e.g., gear 74 as shown, locking all of these gears on shaft 66. Second shaft 68 also has a center portion with a round cross section identical to first shaft 66 and two opposed ends, but only one keyway (not shown) has been cut into the outer surface of second shaft 68 under gear 90. Matching gears 90, 92, 94, 96, 98, 100, 102, etc., are slidably mounted on shaft 68. Only metering gear 90 has a matching keyway (not shown) on its inner circumference and gear 90 is locked to shaft 68. All the other metering gears 92, 94, 96, 98, 100, 102, etc., are not locked to shaft 68. In the mating gear sets which are designated as first set 70-90, second set 72-92, third set 74-94, fourth set 76-96, fifth set 78-98, sixth set 80-100, seventh set 82-102, etc., the gears on shaft 66 which are keyed thereto drive the gears on shaft 68. Since gear 70 on shaft 66 and gear 90 on shaft 68 are both keyed to their respective shafts, the rotation of shaft 66 will cause the rotation of shaft 68.

Partitions and Partition Retainers

Figure 7:
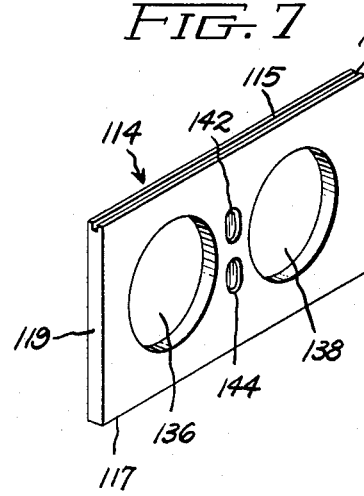
FIG. 7 is a perspective view of a narrow partition which fits into a narrow slot of the partition retainer shown in FIG. 6.

In order to provide hydraulic isolation between adjacent pairs of metering gear sets, a plurality of partitions are axially positioned on opposite sides of each set. These partitions are best shown in FIGS. 1, 2, 4, 7 and 8. Thus in FIGS. 1 and 2, there are shown narrow partitions 114, 116, 119, 120, 122, 126 and 134. Partition 114, shown in detail in FIG. 7, is a rectangular plate having a top edge portion 115, a bottom edge portion 117, and opposed end edge portions 119 and 121. First opening 136 permits first shaft 66 to pass through and second opening 138 permits second shaft 68 to pass through. Grove 140 is formed in top edge 115 of partition 114 for inserting a sealing means such as an elastomeric O-ring strip (not shown). On either side of partition 114 and between opening 136 and 138 there are lateral grooves 142 and 144 called "trapping reliefs" which allow escape of fluid entrapped between the gears of a gear set during gear meshing.

Figure 8:
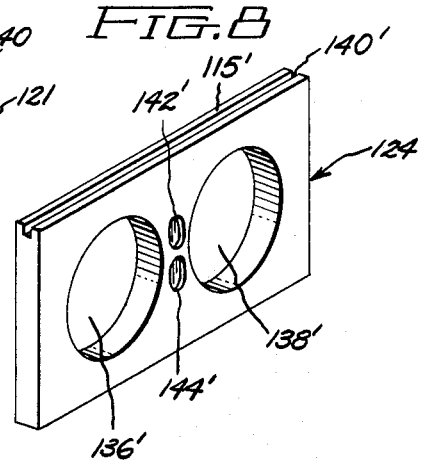
FIG. 8 is a perspective view of the wide partition which fits into the middle slot of the partition retainer shown in FIG. 6.

Center partition 124 is shown in detail in FIG. 8 and is similar in shape to narrow partition 114, except that partition 124 is wider and is typically made in the form of a casting. Partition 124 is located in the center of shafts 66 and 68. In addition to providing hydraulic isolation between adjacent pairs of metering gears, partition 124 also provides central support for shafts 66 and 68 after a predetermined amount of deflection caused by the pressure differential across the flow divider. Partition 124 also has a first opening 136' to permit first shaft 66 to pass through and second opening 138' to permit second shaft 68 to pass through. Groove 140' is formed in top edge 115' of partition 124 for inserting a sealing means, such as an elastomeric O-ring strip (not shown). On either side of partition 124, there are also lateral grooves 142' and 144' which also provide trapping reliefs similar to grooves 142 and 144.

Figure 6:
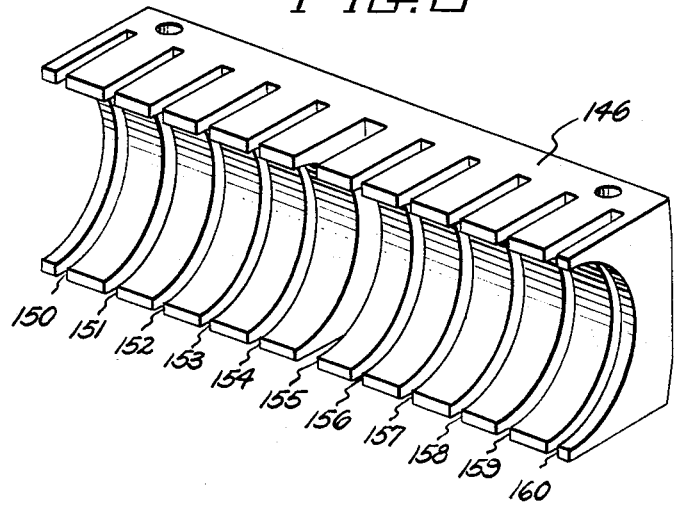
FIG. 6 is a perspective view of one of the slotted partition retainers.

A novel feature of our flow divider is the utilization of a part of slotted partition retainers, designated as first partition retainer 146 and second partition retainer 148, which are installed on each side of the gear and shaft assembly as shown in FIG. 5. First partition retainer 146 is illustrated in detail in FIG. 6, which shows that there are a plurality of spaced lateral slots 150 through 160 having dimensions to receive an end portion of each of the partitions 114, 116, 118, 120, 122, 124, 126, etc., in a fixed relationship to the axial direction of the rotatable shafts 66 and 68. Note that slots 150 through 160 are relatively narrow except slot 155, which is adapted to receive middle partition 124. Both partition retainers 146 and 148 are machined in such a manner that the slots 150 through 160 of the first partition retainer 146 are identical in size and location as the corresponding slots in second partition retainer 148. This duplicity allows partition retainers 146 and 148 to be installed on the gear and shaft assembly shown in FIG. 5 with the partitions 114, 116, 118, 120, 122, 124, 126, etc., sliding into slots 150 through 160 with a tight pressed fit. This provides a rigid axial constraint to the partitions 114, 116, 118, 120, 122, 124, 126, etc. causing them to be fixed in relation to the gear sets 70-90, 72-92, 74-94, 76-96, 78-98, 80-100, 82-102, etc. Partition retainers 146 and 148 are mounted to housing upper half 14 by attaching means such as threaded bolts 162 and 164.

Bearings, Seals and Lubrication

Shaft 66 is supported by tapered roller bearing 170 and a second tapered roller bearing (not shown) while shaft 68 is supported by tapered roller bearings 172 and 174. These bearings, such as illustrated by a two row bearing with cone spacer, are commercially available and are installed in bearing retainers 176 and 178 which are bolted to housing upper half 14 by threaded bolts 180 and 182 for bearing retainer 176, and the like for bearing retainer 178. Due to the criticality of properly locating these bearings, bearing retainers 176 and 178 are fixed in the horizontal plane by dowel pins 184 and 186 for bearing retainer 176, and similar dowel pins (not shown) for bearing retainer 178. Shim 188 shown in FIG. 3, and similar shims (not shown) are placed under protrusions on bearing retainers 176 and 178 which accurately locate the gears and shafts 66 and 68 relative to partition retainers 146 and 148, and thereby establish the proper clearances between the gear tips and ridge 52 of housing upper half 14 and partition retainers 146 and 148, as shown in FIG. 4.

To accommodate thermal expansion of the shafts 66 and 68 when operating with high temperature liquid fuel the shafts 66 and 68 at one end of the flow divider 10 are "fixed" to the bearing retainers and at the other end they are allowed to "float". Thus, as illustrated in FIG. 2, fixing one end of shaft 68 is accomplished by rigidly constraining bearing 174 on shaft 68 using lock nut 198 and in bearing retainer 176 by using a bearing retaining plate 202. Plate 202 abuts the other race of bearing 174, thus preventing any axial movements. The opposite end is illustrated by shaft 66 at which bearing 170 is also constrained to shaft 66 by means of lock nut 200. However, bearing retaining plate 204 does not abut the bearing outer race due to step 106 machined on the periphery of plate 204 through the bore. This provides for freedom of axial movement without compromising radial support.

Tapered roller bearings 170, 172, 174 and the fourth bearing (not shown) are located in lubricating oil chamber 190 and 191', which are isolated from the fuel oil by mechanical face seals 192, 194, 196 and another seal (not shown). These seals allow the rotating shafts 66 and 68 to pass through lube oil chambers 190 and 191' without allowing the fuel oil and the lubricating oil to mix. The objective is to have tapered roller bearings 170, 172, 174, etc., immersed only in lubricating oil of a type suitable for assuring long life. Many fuel oils are not suitable for bearing lubrication and exposure thereto of bearings 170, 172, 174, etc., can result in flow divider seizure caused by worn or corroded bearings.

The lubrication oil is added to each lube oil chamber 190 and 191' via ports 208 and 210. When changing oil, the used lube oil is drained from the chambers 190 and 191' via ports 212 and 214.

If seal failure occurs and high pressure fuel oil is admitted to either lubricating oil chamber 190 and 190' the flow divider 10 may still operate until at some convenient time when repair of the seal can be effected. To prevent a pressure imbalance between the lubricating oil chambers 190 and 191', a pressure equalizing hole 216 has been drilled through shaft 68. Were such a pressure imbalance permitted to occur, it could drive both rotatable shafts 66 and 68 in one direction, causing excessive rubbing of gears against partition spacers. This would result in un unacceptably high torque which may exceed the available operating torque of the flow divider.

Speed Sensor

Speed sensor gears 218 and 220 are fixed to each end of rotatable shaft 66. Two sensors 222 and 224 are used in case one fails. The purpose of gears 218 and 220 is to permit the use of any desired monitoring arrangement to determine rotative speed of the flow divider shafts 66 and 68, which is proportional to the fuel flow to the turbine. For example, by placing a magnetic pickup 222 and 224 in close proximity to the gear teeth, electrical pulses can be generated at a frequency which is proportional to the rotational speed of the flow gear sets. Because of the high volumetric efficiency of the flow divider 10, the speed at which the flow divider gears and shafts 66 and 68 rotate provides a direct correlation to actual fuel flow. For example, if the volume of fluid flowing through the flow divider 10 is relatively low, the rotational speed of the flow divider shafts 66 and 68 is low. This speed signal is a feedback signal which is transmitted into the gas turbine control system.

It will be appreciated that the invention is not limited to the specific details shown in the illustrations and that various modifications may be made within the ordinary skill in the art without departing from the spirit and scope of the invention.

We claim:

1. In an improved flow divider having first and second rotatable shafts carrying respective metering gears of a plurality of sets of metering gears, a main housing body for enclosing said shafts and metering gears, a common fluid inlet connected to one side of each of said gear sets and an individual fluid outlet connected to the other side of each respective one of said gear sets, roller bearings connected to and supporting each end of each of said gear shafts, a source of lubricating oil for lubricating each of said roller bearings, and means for isolating said source of lubricating oil from the fluid metered by each of said metering gears, the improvement comprising:
   first and second continuous gear shafts, each shaft carrying a plurality of spaced metering gears, the metering gears on each shaft mating with corresponding gears on the other shaft and forming mating gear sets;
   all of the metering gears of one shaft and at least one of the metering gears of the second shaft being affixed to their respective shaft while permitting movement of said gears in the axial direction of said shafts;
   a plurality of partitions, each having top, bottom and opposed end edge portions, axially positioned between adjacent gear sets and in substantially fluid sealing arrangement with said shafts;
   first and second partition retainers, each of said retainers having a plurality of spaced slots to receive an end edge portion of each of the partitions in a fixed relationship to the axial direction of the shafts;
   a housing upper half having a plurality of spaced slots in the interior thereof to receive a part of the top edge portion of a partition;
   said housing upper half and said partition retainers defining a metering compartment for each of said metering gear sets;
   a housing lower half adapted to receive said upper half, said metering compartments, and having interior walls spaced from the lower edge portion of said partitions and said metering gear sets to form a common reservoir for said plurality of metering compartments;
   walls defining an inlet passage extending entirely through said lower half to said common reservoir, and walls defining an outlet passage extending through said upper half for each of said metering compartments.

2. The improved flow divider of claim 1, wherein said divider is for distributing fuel oil from a source thereof in equal volumes to each of a plurality of nozzles of a gas turbine combustion can.

3. The improved flow divider of claim 1, wherein the top edge portion of said partitions is fitted with a sealing strip and said strip provides a hydraulic seal between said partition and said upper case half.

4. The improved flow divider of claim 3, wherein said plurality of said partitions is an odd number and the middle partition is thicker than the other partitions, such that during distortion of said shafts said middle partitions provide support for said shafts.

5. The flow divider of claim 1, further comprising a speed sensor gear means connected to at least an end of one of said shafts.

6. The flow divider of claim 1, wherein the bores of said partition retainers form a close clearance common radial cavity with the tips of said gears, said radial cavity being separated into a plurality of smaller cavities by said plurality of partitions.

7. The flow divider of claim 6, wherein said partitions are stationary and said gears are able to slide axially on their respective shafts.

8. The flow divider of claim 7, wherein said lower casing half can be removed to permit inspection of said device without disturbing the internal clearances in said cavity and the tips of said gears.

9. The flow divider of claim 7, wherein one end of said shaft is permitted to slide in an axial direction while the other end is fixed.

10. The flow divider of claim 1, wherein said housing upper half and said housing lower half have mating flanges for connecting said halves together by means of a plurality of fastening members.

11. The flow divider of claim 6, additionally including shims to permit adjustment of the clearances between said radial cavity and the tips of said gears.

* * * * *